United States Patent
Sekar et al.

(10) Patent No.: US 12,041,601 B2
(45) Date of Patent: *Jul. 16, 2024

(54) DYNAMICALLY ALLOCATING CONTROL CHANNEL RESOURCES

(71) Applicant: Sprint Spectrum LP, Overland Park, KS (US)

(72) Inventors: Muthukumaraswamy Sekar, Brambleton, VA (US); Sathyanarayanan Raghunathan, Herndon, VA (US); Maheswaran Vijayakumar, Herndon, VA (US); Suresh Majjara, Herndon, VA (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,095

(22) Filed: Jul. 18, 2023

(65) Prior Publication Data

US 2023/0362918 A1 Nov. 9, 2023

Related U.S. Application Data

(63) Continuation of application No. 16/561,411, filed on Sep. 5, 2019, now Pat. No. 11,818,705.

(51) Int. Cl.
*H04W 72/1263* (2023.01)
*H04W 72/542* (2023.01)

(52) U.S. Cl.
CPC ..... *H04W 72/1263* (2013.01); *H04W 72/542* (2023.01)

(58) Field of Classification Search
CPC .......................... H04W 72/12; H04W 72/1263
See application file for complete search history.

(56) References Cited

U.S. PATENT DOCUMENTS

| | | | |
|---|---|---|---|
| 8,027,297 B2 | 9/2011 | Kim et al. | |
| 2012/0281650 A1* | 11/2012 | Ouchi | H04W 72/0473 370/329 |
| 2016/0165640 A1 | 6/2016 | Yang et al. | |
| 2016/0338052 A1* | 11/2016 | Ji | H04L 1/12 |
| 2018/0227156 A1 | 8/2018 | Papasakellariou | |
| 2019/0159185 A1 | 5/2019 | Seo et al. | |

* cited by examiner

*Primary Examiner* — Sulaiman Nooristany
(74) *Attorney, Agent, or Firm* — Jones Robb, PLLC

(57) ABSTRACT

Responsive to determining that a current channel condition of a communication channel improves from an initial channel condition, scheduling data information in a control transmission portion of the communication channel, and responsive to determining that the current channel condition of the communication channel degrades, scheduling control information in the control transmission portion of the communication channel. The scheduling of the data information and the control information is indicated to the wireless device via a reserve bit transmitted on a resource element, versus RRC signaling.

20 Claims, 7 Drawing Sheets

DYNAMICALLY ALLOCATING CONTROL CHANNEL RESOURCES

This patent application is a continuation of U.S. patent application Ser. No. 16/561,411, filed on Sep. 5, 2019, which is incorporated by reference in its entirety for all purposes.

TECHNICAL BACKGROUND

A heterogeneous network can be configured to include various types of access nodes that are configured to deploy radio air interfaces of different types, such as 4G long-term evolution (LTE), 5G new radio (NR), and so on. Generally, radio air interfaces include physical resources, such as physical resource blocks, that are divided or assigned in both the time domain and the frequency domain. For example, a resource grid of time resources and frequency resources may be comprised of resource elements. Further, a portion of physical resources of a radio air interface may be allocated towards control transmissions, and another portion of physical resources may be allocated towards data transmissions. Briefly, the control transmissions comprise information exchange between access nodes and wireless devices that enable actual transmission of data packets between the access nodes and the wireless devices. For example, control transmissions may be used to set up a voice data session, while data transmissions comprise the actual voice data packets. There are many other applications of control transmissions known to those of ordinary skill in the art, such as identifying resource allocation, signaling bearer information, etc.

Whereas in 4G networks, a dedicated control channel is assigned towards control transmissions and is separated from a different dedicated data channel in the time and/or frequency domain, 5G networks provide for discrete allocations of time/frequency resources known as control channel elements (CCEs). For example, based on channel conditions at the time a connection is being set up between an access node and a wireless device (e.g. during an attach procedure), a control channel element set (CORESET) is assigned to the wireless device, and radio resource control (RRC) signaling is used to communicate the CORESET to the wireless device, such that the wireless device is aware that certain CCEs contain control information. If channel conditions during attach are poor, more CCEs may be assigned in the CORESET. For example, 1, 2, 4, or 8 CCEs can be assigned to a wireless device depending on a signal to interference plus noise ratio (SINR), a channel quality indicator (CQI), or any other channel condition metric measured during the attach procedure.

However, once the CORESET has been assigned, the current state of the art does not enable changing the number of CCEs assigned when channel conditions change during a communication session. In other words, the only means for changing the CORESET is by additional (or new) RRC signaling. Since RRC signaling occurs less frequently (e.g. during the attach procedure), there may be instances where a current channel condition changes from an initial signal condition, and more or less CCEs are needed. In particular, if channel conditions improve from the initial signal condition, fewer CCEs are needed, but the resources occupied by the CCEs are unavailable for data transmission. Thus, resources are wasted that could otherwise be used by a data channel. Various other problems related to an inability to dynamically reallocate CCEs may be envisioned by those having ordinary skill in the art and solved by the present disclosure as provided below.

Overview

Exemplary embodiments described herein include methods, systems, and processing nodes for dynamically allocating control channel resources during a communication session, subsequent to an initial allocation of control channel resources during, for example, an attach procedure. An exemplary method for dynamically allocating control channel resources includes determining that a channel condition of a communication channel between a wireless device and an access node meets a criteria, wherein the communication channel comprises a control transmission portion and a data transmission portion, responsive to determining that the channel condition meets the criteria, scheduling data transmissions in the control transmission portion of the communication channel, and notifying the wireless device that data transmissions are scheduled in the control transmission portion of the communication channel.

An exemplary system for dynamically allocating control channel resources includes a processing node and a processor coupled to the processing node. The processor may be configured to perform operations including monitoring a channel condition of a communication channel between a wireless device and an access node, wherein the communication channel comprises a control transmission portion and a data transmission portion, and a plurality of resources are allocated towards the control transmission portion based on an initial channel condition of the communication channel, responsive to determining that a current channel condition improves from the initial channel condition, scheduling data information in the control transmission portion of the communication channel, and transmitting an indicator to the wireless device, the indicator for enabling the wireless device to receive the data information scheduled in the control transmission portion of the communication channel.

An exemplary processing node for dynamically allocating control channel resources is configured to perform operations including: responsive to determining that a current channel condition of a communication channel between a wireless device and an access node improves from an initial channel condition, scheduling data information in a control transmission portion of the communication channel, and responsive to determining that the current channel condition of the communication channel degrades, scheduling control information in the control transmission portion of the communication channel, wherein the scheduling of the data information and the control information in the portion of resources is indicated to the wireless device via a reserve bit transmitted on a resource element during a communication session utilizing the communication channel.

DETAILED DESCRIPTION

Figure 1:
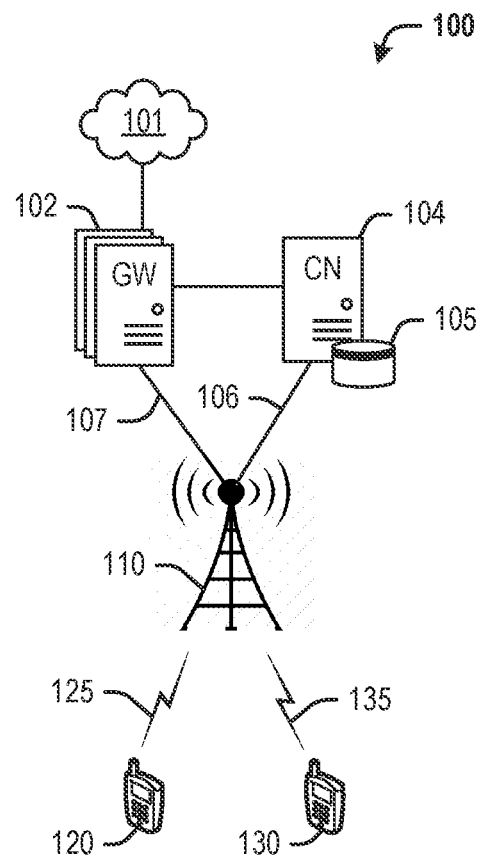
FIG. 1 illustrates an exemplary system for dynamically allocating control channel resources.

The disclosed embodiments illustrate methods, systems, and processing nodes for dynamically allocating control channel resources during a communication session, subsequent to an initial allocation of control channel resources during, for example, an attach procedure. For example, if four CCEs are assigned to a wireless device based on initial channel conditions during the attach procedure, and if current channel conditions improve from the initial channel conditions, then a portion of the four CCEs may be made available for use for data transmissions, such as a physical downlink shared channel (PDSCH). For example, if channel conditions improve during a communication session, as evidenced by a report from the wireless device (e.g. via beamforming feedback, CQI, PMI, etc.), then two of the four CCEs may be made available for data transmissions, thereby improving the utilization of the otherwise unused resources.

While the access node itself is able to transmit data information in CCEs responsive to channel conditions changing as described above, the wireless device is also notified to look for the data information in these CCEs. The identification of the extra CCEs towards data transmissions may be enabled by transmitting (or changing) a specific bit in a control transmission between the access node and the wireless device during the communication session. For example, downlink control information (DCI) messages are regularly transmitted from the access node to wireless devices connected thereto during a communication session. Some DCI messages contain reserve bits, of which a default value may be zero. Thus, a reserve bit may be specified as indicating a change in the reallocation of CCEs, and the reserve bit may be changed from 0 to 1 to indicate that a portion of the CCEs are available for data transmission. Thus, upon receiving the reserve bit, the wireless device is notified to look for data transmissions in the CCEs that are available for data transmission.

In further exemplary embodiments described herein, the value of the reserve bit may indicate what portion of the CCEs are available for data transmission. For example, as described above, changing the value from 0 to 1 can indicate that half the CCEs original allocated (i.e. 2 out of 4 CCEs) are now available for data transmissions. Whereas, if the value of the reserve bit is 2, this can indicate that less than half or more than half the CCEs originally allocated (i.e. 3 out of 4 CCEs, or 1 out of 4 CCEs) are now available for data transmission. Persons having ordinary skill in the art will appreciate that these values and relationships with amounts of CCEs are merely exemplary, and other combinations of values and CCE amounts are possible. Further, the selection of value and, consequently, quantity or percentage of CCEs available for data transmission, can be based on the current channel conditions. For example, if channel conditions improve from original channel conditions by a first amount, then half the CCEs can be used for data transmission, while if channel conditions improve from original channel conditions by a smaller amount, a smaller fraction of CCEs can be used for data transmissions. The bit selection can also be based on the initial CORESET allocation, or any combination of the initial CORESET allocation and the current channel conditions. Further, responsive to determining that the current channel condition of the communication channel degrades, the CCEs may be re-allocated towards control transmissions. In exemplary embodiments, the reserve bit may be changed back to 0, or any default value that indicates to the wireless device that all initially-assigned CCEs (i.e., the CORESET) are allocated for control transmissions.

In addition to the methods described herein, these operations may be performed by an exemplary system described herein as well as by a processing node communicatively coupled to any other network node within the wireless network, such as an access node or a controller node. These and other embodiments are further described herein and with reference to FIGS. 1-7.

FIG. 1 depicts an exemplary system 100 for selecting a subcarrier spacing in a wireless network. System 100 comprises a communication network 101, gateway 102, controller node 104, access node 110, and wireless devices 120 and 130. Access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more arrays, wherein each antenna array is configured to steer or form one or more beams over a geographical region, such as a sector. Wireless devices 120 and 130 are located within range of access node 110 and access network services from access node 110, respectively via communication channels 125, 135. Further, a processing node communicatively coupled to any network node within system 100 (such as, for example, access node 110 or controller node 104) can be configured to determine that a channel condition of a communication channel, such as communication channel 125 between wireless device 120 and access node 110 meets a criteria. The communication channel comprises a plurality of resource blocks that are divided between a control transmission portion and a data transmission portion. Further, the channel condition can include a SINR, beamforming feedback, CQI/PMI etc., such that the channel condition criteria can include a threshold SINR, and so on.

Responsive to determining that the channel condition meets the criteria, access node 110 is configured to schedule data transmissions in the control transmission portion of the communication channel 125. Further, the wireless device 120 is notified that data transmissions are scheduled in the control transmission portion of the communication channel 125. In an exemplary embodiment, notifying the wireless device 120 further comprises transmitting an indicator to the wireless device 120, wherein the indicator is set to a first value that indicates that the access node 110 has scheduled data transmissions in the control transmission portion of the communication channel 125. For example, the indicator can include a reserve bit in a control information message, such as a reserve bit in a DCI message as used in 4G and 5G wireless networks. Access node 110 is configured to transmit the indicator to the wireless device 120 during an active session on the communication channel 125. In other words, the DCI reserve bit may be changed during a communication session, responsive to changes in channel conditions of channel 125. This is advantageous to the prior art, wherein the only way to change a control channel allocation (such as CORESET in 5G) necessitates additional RRC signaling.

In an exemplary embodiment, scheduling data transmissions in the control transmission portion comprises scheduling data transmissions within a fraction of resources in the control transmission portion of channel 125. Thus, a value of the reserve bit may be selected based on the fraction, and/or may be used to indicate the fraction to the wireless device 120. In an exemplary embodiment, the fraction comprises one half. In other words, if 4 CCEs are allocated towards control transmissions, 2 CCEs can be used for data transmissions. An initial size of the control transmission portion (i.e. CORESET in 5G) can be based on an initial channel condition of the communication channel 125. For example, when wireless device 120 initiates an attach procedure with access node 110, it reports certain signal conditions (based on, for example, receipt of a reference signal from access node 110). Those measurements reported by the wireless device comprise initial channel conditions, which are used by access node 110 (or a processing node coupled thereto) to allocate the initial amount of CCEs for wireless device 120. Subsequently, based on current channel conditions reported in an ongoing manner as described herein, the reserve bit is changed to whatever fraction is associated with the reserve bit. Thus, the fraction (and choice of reserve bit) can be based on one or both of the initial size and the channel condition, such that different fractions or portions of the initially-assigned CCEs can be used for different initial allocations and as channel conditions vary, said channel conditions being monitored by access node 110 (or processing node coupled thereto). For example, as the current channel condition of channel 125 returns closer towards the initial channel condition, the portion of CCEs may be re-allocated towards control transmissions, such that access node 110 can schedule control information in the CCEs. Further, a second indicator can be transmitted to the wireless device 120 for enabling the wireless device 120 to receive the control information scheduled in the CCEs. In an exemplary embodiment the second indicator returns the reserve bit to a default value, responsive to which all initially-assigned CCEs (e.g. via CORESET) are used for control transmissions. In another exemplary embodiment, the second indicator provides a different value in the reserve bit, the different value indicating that a smaller portion of CCEs is available for data transmissions. Thus, whereas the initial number/amount of CCEs is communicated to the wireless device via a radio resource message (such as RRC and CORESET in 5G), the reserve bit can be transmitted in any DCI message depending on the implementation of system 100. The reserve bit is transmitted mid-session or at any time independent of RRC signaling, such that it is received by wireless device 120 to identify the data transmissions scheduled in the portion of the CCEs.

Access node 110 can be any network node configured to provide communication between wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as channel conditions of channels 125, 135, CORESET allocations associated with access node 110, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
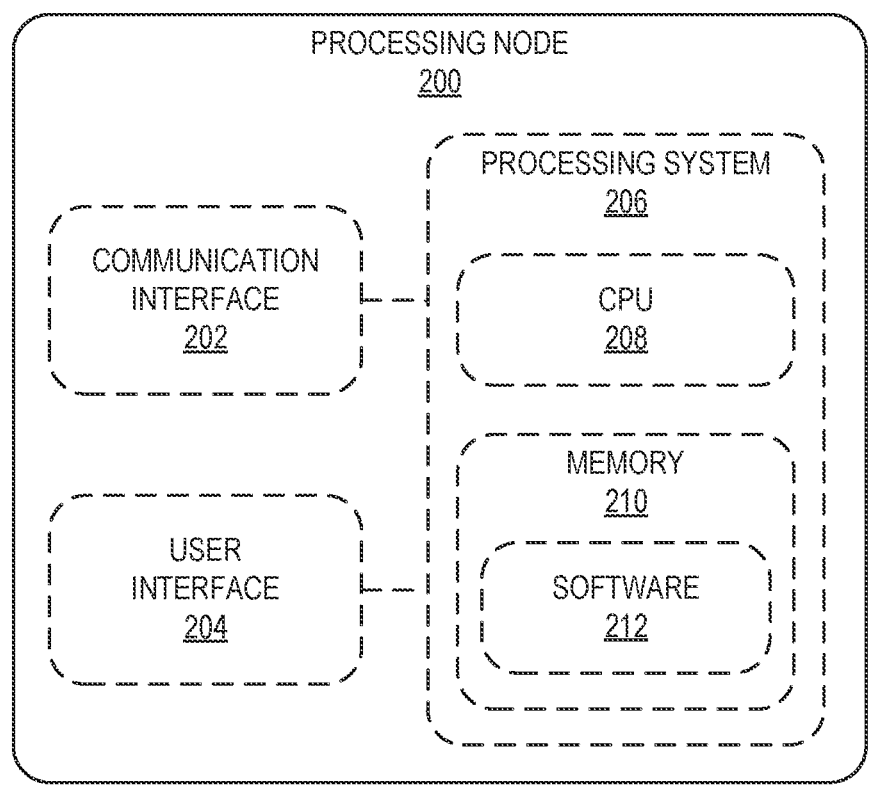
FIG. 2 illustrates an exemplary processing node for dynamically allocating control channel resources.

FIG. 2 depicts an exemplary processing node 200 for dynamically allocating control channel resources. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes instructions that enable processing node 200 to perform operations including scheduling data information in a control transmission portion of the communication channel between a wireless device and an access node responsive to determining that a current channel condition of the communication channel improves from an initial channel condition, and scheduling control information in the control transmission portion of the communication channel responsive to determining that the current channel condition of the communication channel degrades. The scheduling of the data information and the control information in the portion of resources is indicated to the wireless device via a reserve bit transmitted on a resource element during a communication session utilizing the communication channel. The operations further comprise determining the initial channel condition during an initial attach procedure, the initial attach procedure further comprising determining an initial size of the control transmission portion, and identifying the initial size to the wireless device via radio resource control (RRC)

signaling, and the communication session is initialized subsequent to the RRC signaling. The reserve bit can be set from a default value to a first value when the data information is scheduled in the control transmission portion. The first value varies based on an amount of resources in which the data information is scheduled. The reserve bit can be set from the first value to the default value when the control information is scheduled in the control transmission portion.

Figure 3:
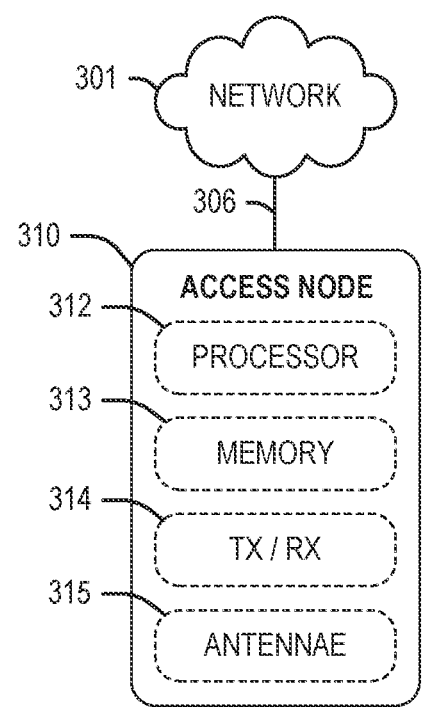
FIG. 3 illustrates an exemplary access node for dynamically allocating control channel resources.

FIG. 3 depicts an exemplary access node 310 for dynamically allocating control channel resources. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over one or more wireless sectors. One pair of transceivers and antennae are illustrated herein solely to simplify the written description, and it may be evident to those having ordinary skill in the art, that any combination of transceivers and antennae may be incorporated in order to deploy different sectors that are configured with different subcarrier spacings, as well as formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations including determining that a channel condition of a communication channel between a wireless device and access node 310 meets a criteria, wherein the communication channel comprises a control transmission portion and a data transmission portion, responsive to determining that the channel condition meets the criteria, scheduling data transmissions in the control transmission portion of the communication channel, and notifying the wireless device that data transmissions are scheduled in the control transmission portion of the communication channel. In another exemplary embodiment, memory 313 includes instructions for monitoring a channel condition of a communication channel between a wireless device and access node 310, wherein the communication channel comprises a control transmission portion and a data transmission portion, and a plurality of resources are allocated towards the control transmission portion based on an initial channel condition of the communication channel, responsive to determining that a current channel condition improves from the initial channel condition, scheduling data information in the control transmission portion of the communication channel, and transmitting an indicator to the wireless device, the indicator for enabling the wireless device to receive the data information scheduled in the control transmission portion of the communication channel. In yet another exemplary embodiment, memory 313 includes instructions for scheduling data information in a control transmission portion of the communication channel between a wireless device and access node 310 responsive to determining that a current channel condition of the communication channel improves from an initial channel condition, and scheduling control information in the control transmission portion of the communication channel responsive to determining that the current channel condition of the communication channel degrades. The scheduling of the data information and the control information in the portion of resources is indicated to the wireless device via a reserve bit transmitted on a resource element during a communication session utilizing the communication channel.

Figure 4:
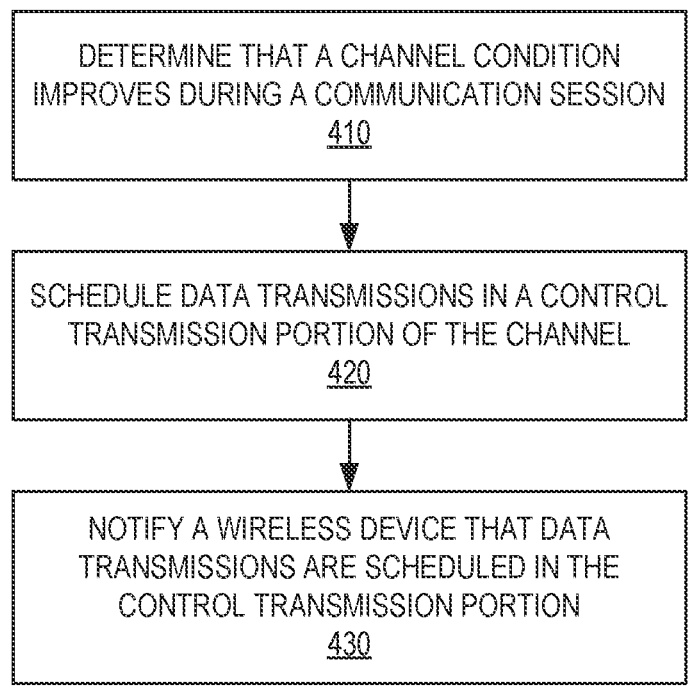
FIG. 4 illustrates an exemplary method for dynamically allocating control channel resources.

FIG. 4 illustrates an exemplary method for selecting a subcarrier spacing in a wireless network. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, it is determined that a channel condition improves during a communication session. The channel condition may be that of a communication channel between a wireless device and an access node. The communication channel comprises a plurality of resource blocks that are divided between a control transmission portion and a data transmission portion. Further, the channel condition can include a SINR, beamforming feedback, CQI/PMI etc., such that the channel condition criteria can include a threshold SINR, and so on.

At 420, responsive to determining that the channel condition meets the criteria, the access node is configured to schedule data transmissions in the control transmission portion of the communication channel. Further, at 430, the wireless device is notified that data transmissions are scheduled in the control transmission portion of the communication channel. In an exemplary embodiment, notifying the wireless device further comprises transmitting an indicator to the wireless device, wherein the indicator is set to a first value that indicates that the access node has scheduled data transmissions in the control transmission portion of the communication channel. For example, the indicator can include a reserve bit in a control information message, such as a reserve bit in a DCI message as used in 4G and 5G wireless networks. The access node is configured to transmit the indicator to the wireless device during an active session on the communication channel. In other words, the DCI reserve bit may be changed during a communication session, responsive to changes in channel conditions of the channel determined at 410. This is advantageous to the prior art, wherein the only way to change a control channel allocation (such as CORESET in 5G) necessitates additional RRC signaling.

Figure 5:
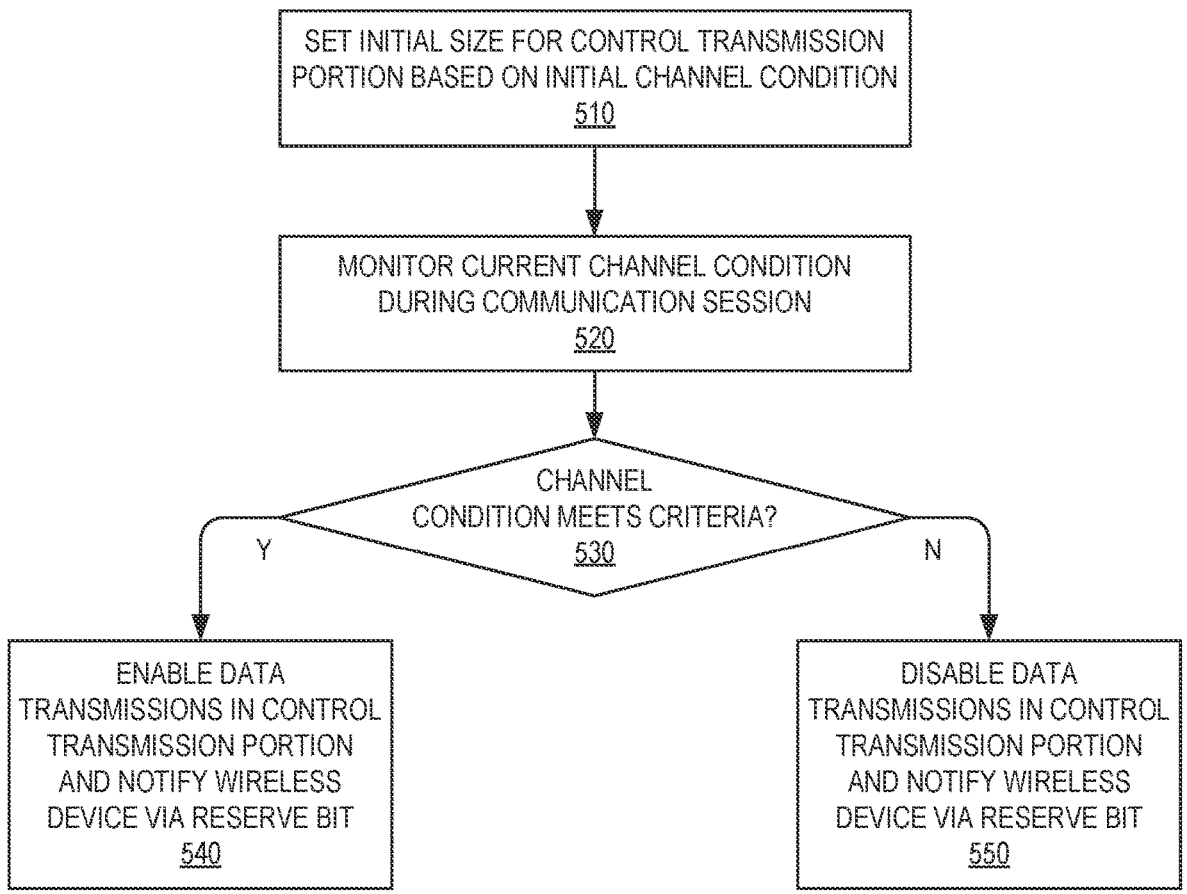
FIG. 5 illustrates another exemplary method for dynamically allocating control channel resources.

FIG. 5 illustrates another exemplary method for dynamically allocating control channel resources. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, an initial size is set for control transmissions in a control transmission portion, based on an initial channel condition. For example, a communication channel between a wireless device and an access node comprises a plurality of resource blocks that are divided between a control transmission portion and a data transmission portion. An initial size of the control transmission portion (i.e. CORESET in 5G) can be based on an initial channel condition of the communication channel. When a wireless device initiates an attach procedure with the access node, it reports certain signal conditions (based on, for example, receipt of a reference signal from the access node). Those measurements reported by the wireless device comprise initial channel conditions, which are used by the access node (or a processing node coupled thereto) to allocate the initial amount of CCEs for the wireless device.

At 520 and 530, a current channel condition is monitored and compared with a criteria. The current channel condition can include a SINR, beamforming feedback, CQI/PMI etc., and the criteria can include a threshold of any of these values. Notably, the current channel condition may comprise any metric of channel conditions that can be different from the initial channel condition from step 510, particularly since the current channel condition may be associated with an ongoing communication session, while the initial channel condition may have been related to an attach procedure. In either case, if at 530 it is determined that the channel condition meets the criteria (i.e. improves to meet a threshold value of SINR, etc.), then at 540 data transmissions are enabled in the control transmission portion of the control channel, and the wireless device is notified of the same. In other words, at 540, the access node is configured to schedule data transmissions in the control transmission portion of the communication channel, and notify the wireless device that data transmissions are scheduled in the control transmission portion of the communication channel, using for example an indicator in a reserve bit of a DCI message, wherein the indicator is set to a first value that indicates that the access node has scheduled data transmissions in the control transmission portion of the communication channel. Alternatively or on addition, if at 530 it is determined that the channel condition does not meet the criteria (i.e. degrades, or remains close to the initial channel condition), then at 550 data transmissions are disabled in the control transmission portion of the control channel, and the control transmission portion (e. CCEs) are allocated for control transmissions. Further, the wireless device is notified that control transmissions are scheduled in the control transmission portion of the communication channel, using for example an indicator in a reserve bit of a DCI message, wherein the indicator is set to a second value that indicates that the access node has scheduled control transmissions in the control transmission portion of the communication channel.

Figure 6A:
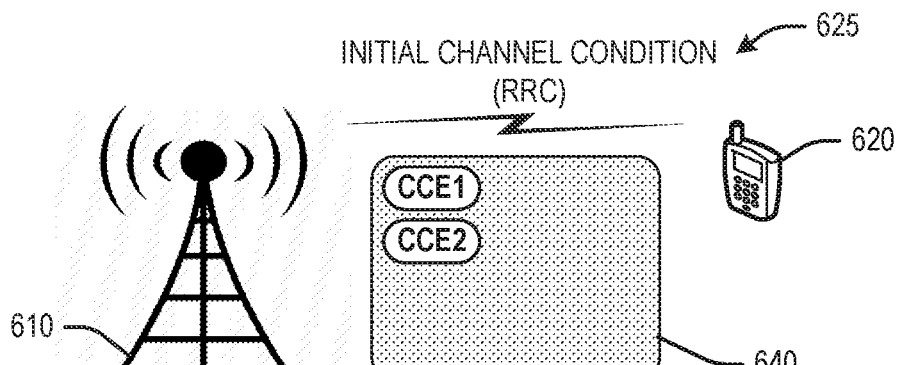
FIGS. 6A-6C illustrate exemplary allocations of control channel resources.
Figure 6B:
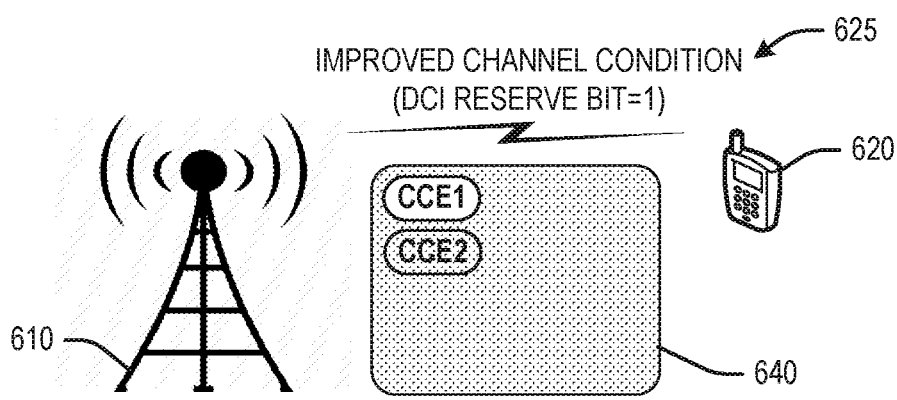
Figure 6C:
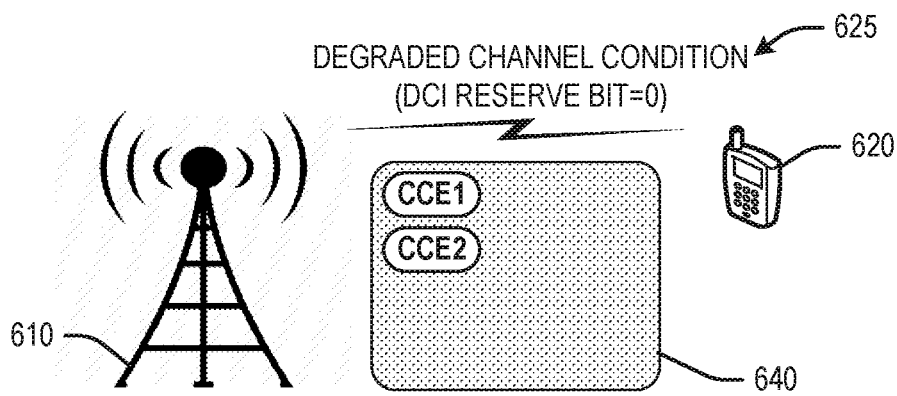

FIGS. 6A-6C illustrate exemplary allocations of control channel resources. Access node 610 may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more arrays, wherein each antenna array is configured to steer or form one or more beams over a geographical region, such as a sector. Wireless device 620 is located within range of access node 610 and accesses network services from access node 610, respectively via communication channel 625. Communication channel 625 comprises a plurality of resource blocks 640 that are divided between a control transmission portion (CCEs) and a data transmission portion. Further, a processing node communicatively coupled to access node 610 can be configured to perform the operations described herein. For example, with reference to FIG. 6A, wireless device 620 may report initial channel conditions (i.e. channel conditions at the time a connection is being set up between access node 610 and wireless device 620 during, for example, an attach procedure). Based on the initial channel conditions, a quantity of CCEs (i.e. CCE1 and CCE2) are assigned to the wireless device 620, and radio resource control (RRC) signaling is used to communicate this allocation to the wireless device 620, such that the wireless device 620 is able to access the control information within CCE1 and CCE2.

With reference to FIG. 6B, during a communication session, a current channel condition of channel 625 may change. For example, the channel condition may meet a threshold, wherein meeting the threshold indicates that channel conditions have improved from the initial channel conditions. The channel condition can include a SINR, beamforming feedback, CQI/PMI etc. reported from wireless device 620 during a communication session, and the channel condition criteria can include a threshold of any of these values. Thus, responsive to determining that the channel condition meets the criteria, access node 610 is configured to schedule data transmissions in one or more CCEs. For example, as illustrated in FIG. 6B, CCE2 is now allocated for data transmissions. Further, the wireless device 620 is notified that data transmissions are scheduled in the control transmission portion CCE2 via a reserve bit set to a first value (i.e. 1) that indicates that the access node 610 has scheduled data transmissions in the control transmission portion CCE2 of the resources 640.

Further, with reference to FIG. 6C, the current channel condition of channel 625 may degrade back towards the initial channel condition (or may generally worsen). The degradation may be determined by wireless device 620 reporting channel conditions worse than the threshold. Responsive to determining the degraded channel condition, access node 610 is configured to utilize all control transmissions portions (i.e. CCE1 and CCE2) to transmit control information. Further, the reserve bit may be changed back to 0 and communicated to the wireless device 620 in a DCI message, enabling wireless device 620 to retrieve control information from CCE1 and CCE2. Thus, based on current channel conditions reported in an ongoing manner as described herein, and transmitting the indicator in a DCI reserve bit, control channel resources can be allocated dynamically during a communication session.

Figure 7A:
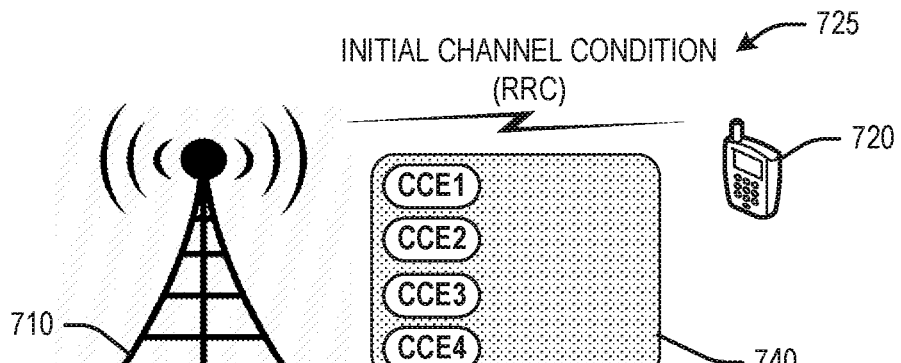
FIGS. 7A-7C illustrate exemplary allocations of control channel resources.
Figure 7B:
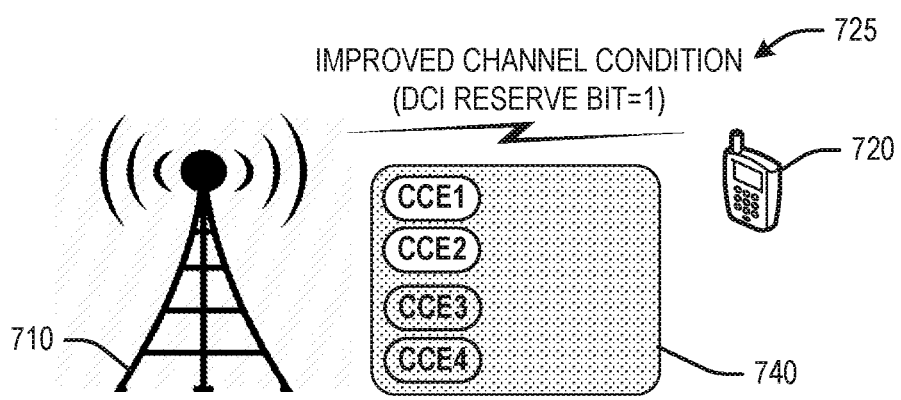
Figure 7C:
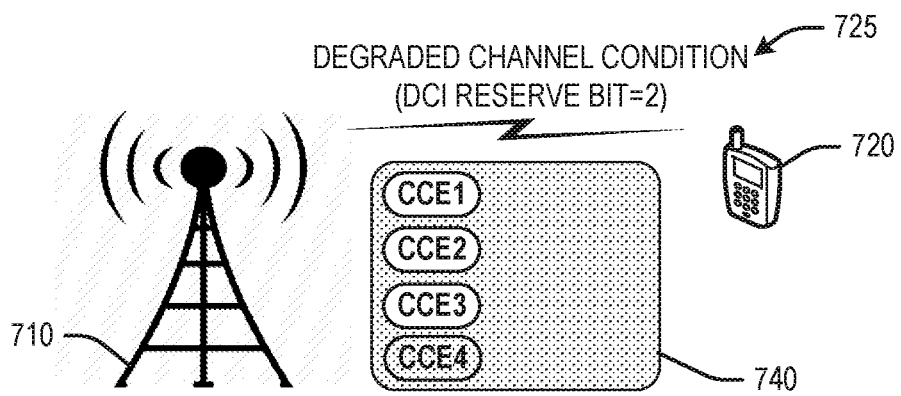

FIGS. 7A-7C illustrate exemplary allocations of control channel resources. Access node 710 may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more arrays, wherein each antenna array is configured to steer or form one or more beams over a geographical region, such as a sector. Wireless device 720 is located within range of access node 710 and accesses network services from access node 710, respectively via communication channel 725. Communication channel 725 comprises a plurality of resource blocks 740 that are divided between a control transmission portion (CCEs) and a data transmission portion. Further, a processing node communicatively coupled to access node 710 can be configured to perform the operations described herein. For example, with reference to FIG. 7A, wireless device 720 may report initial channel conditions (i.e. channel conditions at the time a connection is being set up between access node 710 and wireless device 720 during, for example, an attach procedure). Based on the initial channel conditions, a quantity of CCEs (i.e. CCE1, CCE2, CCE3, and CCE4) are assigned to the wireless device 720, and radio resource control (RRC) signaling is used to communicate this allocation to the wireless device 720, such that the wireless device 720 is able to access the control information within CCE1-CCE4. In an exemplary embodiment, this is contrasted with FIG. 6A, wherein channel conditions here may necessitate more CCEs.

With reference to FIG. 7B, during a communication session, a current channel condition of channel 725 may change. For example, the channel condition may meet a threshold, wherein meeting the threshold indicates that channel conditions have improved from the initial channel conditions. The channel condition can include a SINR, beamforming feedback, CQI/PMI etc. reported from wireless device 720 during a communication session, and the channel condition criteria can include a threshold of any of these values. Thus, responsive to determining that the channel condition meets the criteria, access node 710 is configured to schedule data transmissions in one or more CCEs. For example, as illustrated in FIG. 7B, CCE3 and CCE4 are now allocated for data transmissions. Further, the wireless device 720 is notified that data transmissions are scheduled in the control transmission portions CCE3 and CCE4 via a reserve bit set to a first value (i.e. 1) that indicates that the access node 710 has scheduled data transmissions in the specified control transmission portions of the resources 740.

Further, with reference to FIG. 7C, the current channel condition of channel 725 may degrade to a level that is not the same as the initial channel condition, but worse than the channel condition of FIG. 7B. The degradation may be determined by wireless device 720 reporting channel conditions worse than a second threshold. Responsive to determining the degraded channel condition, access node 710 is configured to utilize more control transmissions portions (i.e. CCE1-CCE3) to transmit control information and a smaller portion (i.e. CCE4) to transmit data information. Thus, the reserve bit may be changed to a third value (i.e. 2) and communicated to the wireless device 720 in a DCI message, enabling wireless device 720 to retrieve data information only from CCE4. Thus, the amount of CCEs (and choice of reserve bit) can be based on one or both of the initial size and the channel condition, such that different fractions or portions of the initially-assigned CCEs can be used for different initial allocations and as channel conditions vary, said channel conditions being monitored by access node 710 (or processing node coupled thereto). Whereas the initial number/amount of CCEs is communicated to the wireless device via a radio resource message (such as RRC and CORESET in 5G), the reserve bit can be transmitted in any DCI message. The reserve bit is transmitted mid-session or at any time independent of RRC signaling, such that it is received by wireless device 720 to identify the data transmissions scheduled in the portion of the CCEs.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically allocating control channel resources, the method comprising:
   determining that a channel condition of a communication channel between a wireless device and an access node meets a criteria, wherein the communication channel comprises a control transmission portion and a data transmission portion;
   responsive to determining that the channel condition meets the criteria, scheduling data transmissions in the control transmission portion of the communication channel; and
   notifying the wireless device that data transmissions are scheduled in the control transmission portion of the communication channel.

2. The method of claim 1, wherein:
   notifying the wireless device further comprises transmitting an indicator to the wireless device, and
   the indicator is set to a first value that indicates that the access node has scheduled data transmissions in the control transmission portion of the communication channel.

3. The method of claim 2, wherein the indicator comprises a reserve bit in a control information message.

4. The method of claim 2, wherein the indicator is transmitted from the access node to the wireless device during an active session on the communication channel.

5. The method of claim 2, wherein scheduling data transmissions in the control transmission portion comprises scheduling data transmissions within a fraction of resources in the control transmission portion.

6. The method of claim 5, further comprising selecting the first value based on the fraction.

7. The method of claim 6, wherein the fraction comprises one half.

8. The method of claim 1, further comprising determining an initial size of the control transmission portion based on an initial channel condition of the communication channel.

9. The method of claim 8, wherein the initial size comprises a quantity of control channel elements (CCEs).

10. The method of claim 8, further comprising transmitting the initial size to the wireless device in a radio resource control (RRC) message.

11. The method of claim 10, further comprising monitoring the channel condition to determine whether or not the channel condition meets the criteria subsequent to transmitting the initial size to the wireless device.

12. A system for dynamically allocating control channel resources, the system comprising:
    a processing node; and a processor coupled to the processing node, the processor for enabling the processing node to perform operations comprising:

monitoring a channel condition of a communication channel between a wireless device and an access node, wherein the communication channel comprises a control transmission portion and a data transmission portion, and a plurality of resources are allocated towards the control transmission portion based on an initial channel condition of the communication channel;

responsive to determining that a current channel condition improves from the initial channel condition, scheduling data information in the control transmission portion of the communication channel; and transmitting an indicator to the wireless device, the indicator for enabling the wireless device to receive the data information scheduled in the control transmission portion of the communication channel.

13. The system of claim 12, wherein:

the monitoring of the channel condition is performed during a communication session utilizing the communication channel subsequent to an initial attach procedure, and the plurality of resources are allocated based on the initial channel condition during the initial attach procedure.

14. The system of claim 13, wherein the indicator comprises a reserve bit in a control information message that is transmitted to the wireless device during the communication session.

15. The system of claim 12, further comprising:

determining that the current channel condition returns closer towards the initial channel condition;

scheduling control information in the control transmission portion of the communication channel; and transmitting a second indicator to the wireless device, the second indicator for enabling the wireless device to receive the control information scheduled in the control transmission portion of the communication channel.

16. A processing node for dynamically allocating control channel resources, the processing node being configured to perform operations comprising:

responsive to determining that a current channel condition of a communication channel between a wireless device and an access node improves from an initial channel condition, scheduling data information in a control transmission portion of the communication channel; and responsive to determining that the current channel condition of the communication channel degrades, scheduling control information in the control transmission portion of the communication channel, wherein the scheduling of the data information and the control information in the control transmission portion is indicated to the wireless device via a reserve bit transmitted on a resource element during a communication session utilizing the communication channel.

17. The processing node of claim 16, wherein the operations further comprise:

determining the initial channel condition during an initial attach procedure, the initial attach procedure further comprising determining an initial size of the control transmission portion; and identifying the initial size to the wireless device via radio resource control (RRC) signaling, wherein the communication session is initialized subsequent to the RRC signaling.

18. The processing node of claim 17, further comprising setting the reserve bit from a default value to a first value when the data information is scheduled in the control transmission portion.

19. The processing node of claim 18, wherein the first value varies based on an amount of resources in which the data information is scheduled.

20. The processing node of claim 18, further comprising setting the reserve bit from the first value to the default value when the control information is scheduled in the control transmission portion.

* * * * *